United States Patent [19]

Genta

[11] 3,847,541
[45] Nov. 12, 1974

[54] 1,4-DIAMINO-2-ALKYLTHIOPHENOXY-3-HALOANTHRAQUINONE POLYESTER DYES

[75] Inventor: Guido Genta, Snyder, N.Y.

[73] Assignee: American Aniline Products, Inc., Paterson, N.J.

[22] Filed: Aug. 9, 1973

[21] Appl. No.: 387,184

Related U.S. Application Data

[62] Division of Ser. No. 243,059, April 11, 1972, Pat. No. 3,786,074.

[52] U.S. Cl.................... 8/39, 260/380, 260/381, 8/21 C
[51] Int. Cl............................................. C09b 1/00
[58] Field of Search .......... 8/39, 40, 21 C; 260/380, 260/381

[56] References Cited

UNITED STATES PATENTS

| 3,210,383 | 10/1965 | Ferrari et al. | 260/380 |
| 3,293,270 | 12/1966 | Hederich et al. | 260/380 |
| 3,557,155 | 1/1971 | Yamada et al. | 8/39 |
| 3,632,612 | 1/1972 | Leng et al. | 8/39 |

*Primary Examiner*—Harvey E. Behrend
*Assistant Examiner*—P. A. Nelson
*Attorney, Agent, or Firm*—Armstrong, Nikaido & Wegner

[57] ABSTRACT

1,4-Diamino-2,3-dihaloanthraquinones are reacted with an alkylthiophenol in an alkaline medium to produce 1,4-diamino-2-alkylthiophenoxy-3-haloanthraquinones useful as dyes for polyester fibers.

5 Claims, No Drawings

1,4-DIAMINO-2-ALKYLTHIOPHENOXY-3-HALOANTHRAQUINONE POLYESTER DYES

This is a division, of application Ser. No. 243,059, filed Apr. 11, 1972, now U.S. Pat. No. 3,786,074.

BACKGROUND OF THE INVENTION

Various water-insoluble anthraquinones have long been known in the dyestuff art. In the early years, many were merely intermediates for the production of water soluble dyes for wool. Later, water-insoluble anthraquinones were proposed for the dyeing of synthetic fibers such as cellulose acetates. However, due to the difficulty of dyeing polyester materials, the traditional anthraquinone compounds which were either intermediates for the production of wool dyes or were themselves suitable for the dyeing of synthetics such as the cellulose acetates, were not found suitable for the coloration of polyesters. Some classes of compounds, notably the 1-amino-4-hydroxyanthraquinone family, have been found suitable for the coloration of polyester materials. Hederich et al., U.S. Pat. No. 3,293,270, is exemplary of efforts in this class of compounds. However, investigation within the class of 1,4-diaminoanthraquinones has not been as successful. Anthraquinones of this latter series are known in the art, for example, 1,4-diamino-2-chloro-3-phenoxyanthraquinone is described in Jacobi, U.S. Pat. No. 1,038,589. However, investigation of this compound as a dye for polyester has met with failure due to the relatively poor characteristics of the compound as a polyester dye.

I have now discovered a class of compounds within the 1,4-diaminoanthraquinone series which are excellent polyester dyes.

SUMMARY OF THE INVENTION

In accordance with the invention I have discovered a new class of 1,4-diaminoanthraquinones of the formula

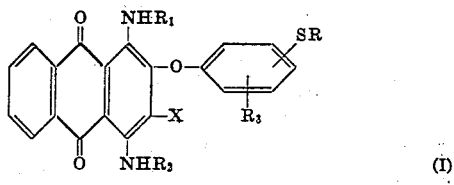

(I)

wherein
  R is methyl or ethyl; each of $R_1$, $R_2$ and $R_3$ is independently hydrogen or lower alkyl; and
  X is chlorine or bromine.

In accordance with the preferred embodiment of the invention there are provided compounds of the formula

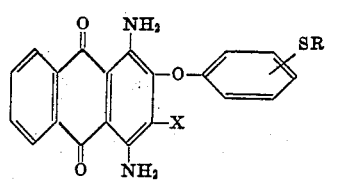

(Ia)

wherein X is chlorine or bromine.

DETAILED DESCRIPTION

The compounds of the invention (I) are produced through the reaction of a dihaloanthraquinone of the formula

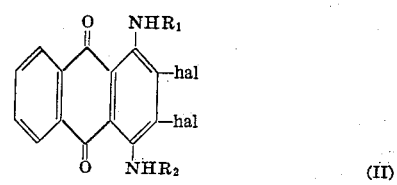

(II)

wherein $R_1$ and $R_2$ are as defined above and hal is chlorine or bromine, with a thioether of the formula

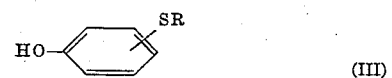

(III)

wherein R is as defined above. The reaction of the dihaloanthraquinone (II) and the thioether (III) is conducted under alkaline conditions to yield the compounds of the invention (I).

As the groups $R_1$, $R_2$ and $R_3$ may be mentioned hydrogen or lower alkyl groups such as methyl, ethyl, n-propyl and n-butyl, as well as the secondary and tertiary forms of the alkyl groups.

Preferred as the thioether group —SR may be mentioned methylthio and ethylthio.

As the group X may be mentioned the halogen atoms, particularly chlorine and bromine.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfeiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100 percent color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

The following examples serve to illustrate the invention:

EXAMPLE I

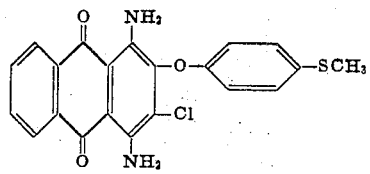

M.W. 410.5

To a one liter flask were charged

| | |
|---|---|
| 100 g. | 4-(Methylthio)phenol |
| 100 g. | Sulfolane |
| 20 g. | potassium carbonate |
| 50 g. | 1,4-diamino-2,3-dichloroanthraquinone. |
| | The mixture was slowly heated to 160–165° while distilling off water formed during the reaction. The temperature was held at 160–165° during a 16 hour period. It was then cooled to room temperature and the whole was diluted with |
| 320 g. | denatured ethanol. |
| | The dye obtained was separated by filtration and was washed with |
| 240 g. | denatured ethanol followed by warm water. |
| | Yield: 217 g. cake |
| | D.T. 21% = 45 g. oil color |
| | Residual Chlorine 6.2%. |

EXAMPLE II

The wet cake of Example I was ballmilled into an 11 percent paste containing 15 percent Marasperse N–22 based on the final weight of the paste. The dye was found to produce excellent dyeings on polyethylene terephthalate. The dyeings may be produced via carrier, pressure and thermofixation methods. The dyeings on polyethylene terephthalate are clear violet and possess excellent fastness to light. The dyeings also possess good fastness to sublimation.

EXAMPLE III

The sublimation fastness of the dyeing of Example II on polyethylene terephthalate was compared with a dyeing made on polyethylene terephthalate with the compound 1,4-diamino-2,3-diphenoxyanthraquinone. The sublimation fastness of the dyeing of Example II was found to be clearly superior to that of the dyeing with 1,4-diamino-2,3-diphenoxyanthraquinone.

EXAMPLE IV

By substituting an equimolar quantity of 4-(ethylthio) phenol for the 4-(methylthio)phenol in the procedure of Example I, a compound having the following formula is produced:

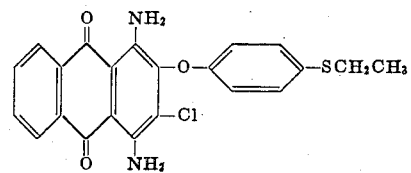

The compound dyes polyethylene terephthalate in violet shades according to the procedure of Example II.

What is claimed is:

1. A polyester textile material dyed with a compound of the formula

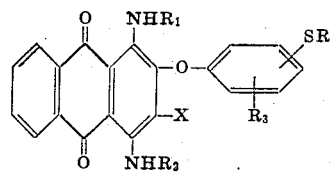

wherein R is methyl or ethyl;
each of $R_1$, $R_2$ and $R_3$ is independently hydrogen or lower alkyl, and
X is chlorine or bromine.

2. A polyester textile material of claim 1 dyed with a compound of the formula

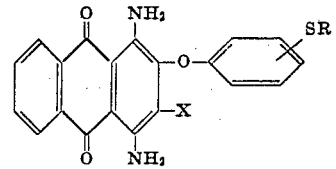

wherein X is chlorine or bromine.

3. A polyester textile material dyed with the formula of claim 1 wherein X is chlorine.

4. A polyester textile material dyed with the formula of claim 1 wherein R is methyl.

5. A polyester textile material dyed with the formula of claim 1 wherein R is ethyl.

* * * * *